US012606168B2

(12) United States Patent
Lau et al.

(10) Patent No.: US 12,606,168 B2
(45) Date of Patent: Apr. 21, 2026

(54) VIRTUAL VEHICLE FOR INTERSECTION EDGING AND VIRTUAL STOP LINES

(71) Applicant: Nissan North America, Inc., Franklin, TN (US)

(72) Inventors: Derek Lau, San Francisco, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 184 days.

(21) Appl. No.: 18/243,284

(22) Filed: Sep. 7, 2023

(65) Prior Publication Data

US 2025/0083676 A1     Mar. 13, 2025

(51) Int. Cl.
*B60W 30/18* (2012.01)
*B60W 60/00* (2020.01)

(52) U.S. Cl.
CPC .. *B60W 30/18154* (2013.01); *B60W 60/0027* (2020.02); *B60W 2520/10* (2013.01);
(Continued)

(58) Field of Classification Search
CPC ....... B60W 30/18154; B60W 60/0027; B60W 2520/10; B60W 2520/105; B60W 2552/802; B60W 2555/60; B60W 2720/10; B60W 60/00276; B60W 30/0956; G08G 1/166
See application file for complete search history.

(56) References Cited

U.S. PATENT DOCUMENTS

| | | | |
|---|---|---|---|
| 12,071,136 B2 | 8/2024 | Malaran et al. | |
| 2017/0113665 A1* | 4/2017 | Mudalige | G08G 1/163 |

(Continued)

FOREIGN PATENT DOCUMENTS

| | | |
|---|---|---|
| JP | 2021154818 A | 10/2021 |
| JP | 2023046107 A | 4/2023 |

OTHER PUBLICATIONS

U.S. Appl. No. 18/345,501, "Proactive Risk Mitigation with Generalized Virtual Vehicles", filed Jul. 5, 2023, 108 pp.

*Primary Examiner* — Khoi H Tran
*Assistant Examiner* — Tristan J Greiner
(74) *Attorney, Agent, or Firm* — Young Basile Hanlon & MacFarlane, P.C.

(57) ABSTRACT

At least one virtual road user is generated, wherein a position of a respective virtual road user of the at least one virtual road user corresponds to a border of a range of a sensor of a host vehicle approaching an intersection of a vehicle transportation network. A most relevant virtual road user of the at least one virtual road user is determined, the most relevant virtual road user being associated with an earliest crossing lane of the intersection from a perspective of the host vehicle. A time to contact for the most relevant virtual road user is determined, wherein the time to contact is based on an acceleration of the host vehicle, a predicted trajectory of the most relevant virtual road user, and a relative distance between the host vehicle and the most relevant virtual road user. A target speed for the host vehicle is determined based on the time to contact and the relative distance. The host vehicle is operated using the target speed as input to a control system of the host vehicle.

20 Claims, 9 Drawing Sheets

(52) U.S. Cl.
CPC ... *B60W 2520/105* (2013.01); *B60W 2552/05*
(2020.02); *B60W 2554/802* (2020.02); *B60W*
*2555/60* (2020.02); *B60W 2720/10* (2013.01)

(56) References Cited

U.S. PATENT DOCUMENTS

| 2019/0329768 | A1* | 10/2019 | Shalev-Shwartz | ....... G05D 1/65 |
|---|---|---|---|---|
| 2020/0122724 | A1* | 4/2020 | Hiramatsu | .......... B60W 30/181 |
| 2020/0189573 | A1* | 6/2020 | King | ................... B60R 21/0134 |
| 2021/0031760 | A1* | 2/2021 | Ostafew | ................ B60W 30/09 |
| 2021/0061269 | A1* | 3/2021 | Petroff | ........... B60W 30/18159 |
| 2022/0185267 | A1* | 6/2022 | Beller | ............... B60W 30/0956 |
| 2022/0396290 | A1 | 12/2022 | Oh | |
| 2023/0140569 | A1 | 5/2023 | Foster et al. | |
| 2023/0399020 | A1* | 12/2023 | Shi | ................... B60W 30/0956 |

* cited by examiner

VIRTUAL VEHICLE FOR INTERSECTION EDGING AND VIRTUAL STOP LINES

TECHNICAL FIELD

This application generally relates to risk mitigation for autonomous vehicles, more specifically, to intersection edging and virtual stop lines during trajectory planning for autonomous vehicles.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, external objects make traversing the transportation network difficult.

SUMMARY

Disclosed herein are aspects, features, elements, and implementations for proactive risk mitigation.

A first aspect of the disclosed implementation is a method that including generating at least one virtual road user, wherein a position of a respective virtual road user of the at least one virtual road user corresponds to a border of a range of a sensor of a host vehicle approaching an intersection of a vehicle transportation network, determining a most relevant virtual road user of the at least one virtual road user, the most relevant virtual road user associated with an earliest crossing lane of the intersection from a perspective of the host vehicle, determining a time to contact for the most relevant virtual road user, wherein the time to contact is based on an acceleration of the host vehicle, a predicted trajectory of the most relevant virtual road user, and a relative distance between the host vehicle and the most relevant virtual road user, determining, based on the time to contact and the relative distance, a target speed for the host vehicle, and operating the host vehicle using the target speed as input to a control system of the host vehicle.

A second aspect of the disclosed implementation is an apparatus including a processor. The processor is configured to generate at least one virtual road user, wherein a position of a respective virtual road user of the at least one virtual road user corresponds to a border of a range of a sensor of a host vehicle approaching an intersection of a vehicle transportation network, determine a most relevant virtual road user of the at least one virtual road user, the most relevant virtual road user associated with an earliest crossing lane of the intersection from a perspective of the host vehicle, determine a time to contact for the most relevant virtual road user, wherein the time to contact is based on an acceleration of the host vehicle, a predicted trajectory of the most relevant virtual road user, and a relative distance between the host vehicle and the most relevant virtual road user, determine, based on the time to contact and the relative distance, a target speed for the host vehicle, and operate the host vehicle using the target speed as input to a control system of the host vehicle.

A third aspect of the disclosed implementation is a non-transitory computer-readable medium storing instructions operable to cause one or more processors to perform operations that include generating at least one virtual road user, wherein a position of a respective virtual road user of the at least one virtual road user corresponds to a border of a range of a sensor of a host vehicle approaching an intersection of a vehicle transportation network, determining a most relevant virtual road user of the at least one virtual road user, the most relevant virtual road user associated with an earliest crossing lane of the intersection from a perspective of the host vehicle, determining a time to contact for the most relevant virtual road user, wherein the time to contact is based on an acceleration of the host vehicle, a predicted trajectory of the most relevant virtual road user, and a relative distance between the host vehicle and the most relevant virtual road user, determining, based on the time to contact and the relative distance, a target speed for the host vehicle, and operating the host vehicle using the target speed as input to a control system of the host vehicle.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
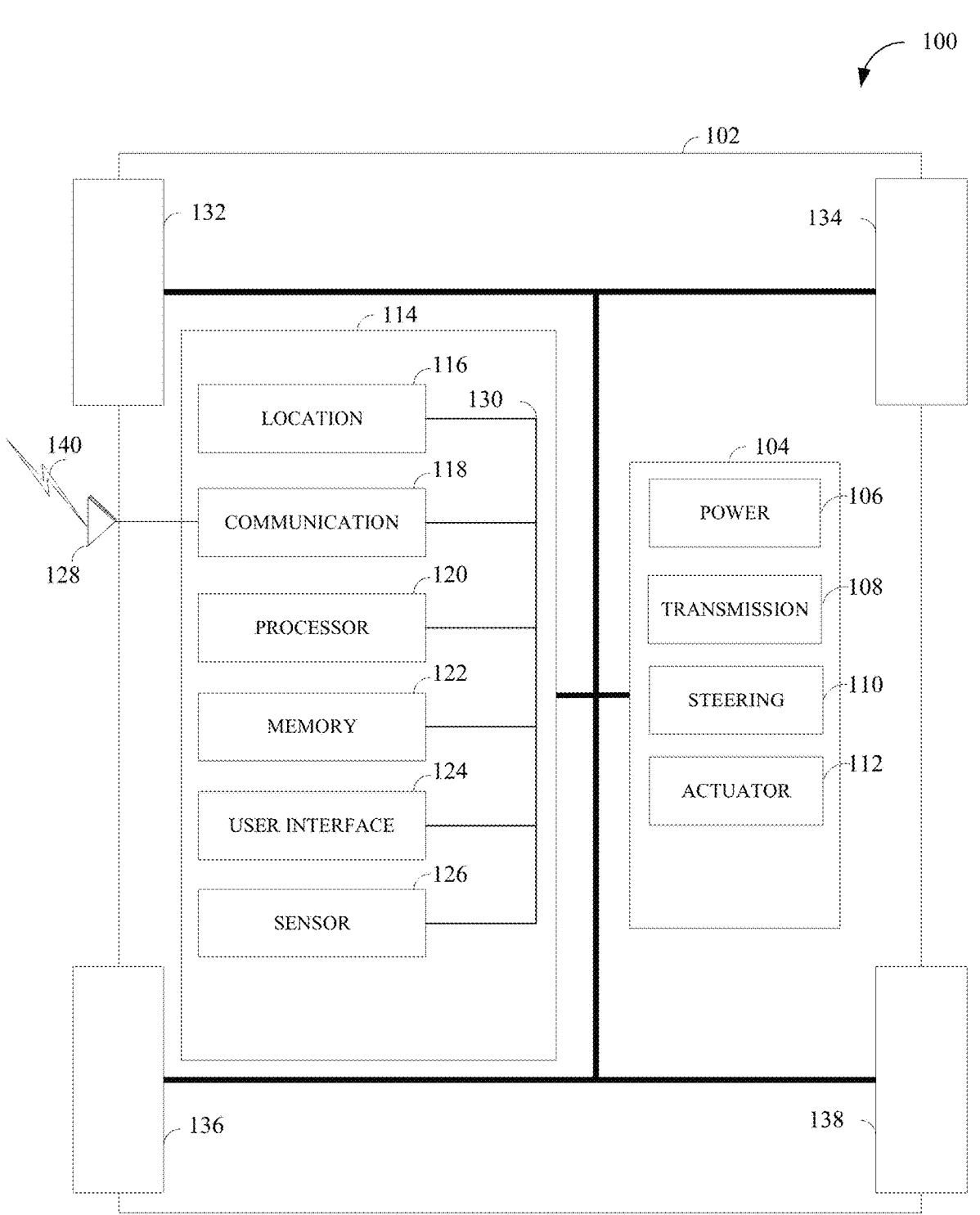
FIG. 1 is a diagram of an example of a portion of a vehicle in which the aspects, features, and elements disclosed herein may be implemented.

A vehicle may traverse a portion of a vehicle transportation network. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof.

The vehicle may include one or more sensors. Traversing the vehicle transportation network may include the sensors generating or capturing sensor data, such as data corresponding to an operational environment of the vehicle, or a portion thereof. For example, the sensor data may include information corresponding to one or more potential hazards that materialize into or are identified as (e.g., resolve to) respective external objects. Such an object may also be referred to as a hazard object herein.

A hazard object can be a static object. A static object is one that is stationary and is not expected to move in the next few seconds. Examples of static objects include a bike with no rider, a cold vehicle, an empty vehicle, a road sign, a wall, a building, a pothole, etc.

A hazard object can be a stopped object. A stopped object is one that is stationary but might move at any time. Examples of stopped objects include a vehicle that is stopped at a traffic light and a vehicle on the side of the road with an occupant (e.g., a driver). In some implementations, a stopped object may be considered a static object.

A hazard object can be a dynamic (i.e., moving) object, such as a pedestrian, a remote vehicle, a motorcycle, a bicycle, etc. The dynamic object can be oncoming (toward the vehicle) or can be moving in the same direction as the vehicle. The dynamic object can be moving longitudinally or laterally with respect to the vehicle. A stopped object can become a dynamic object, and vice versa.

There are two common courses of action responsive to detection of a potential hazard. The vehicle may ignore the potential hazard until the potential hazard is confirmed as a hazard object that may interfere with the vehicle's path of travel or is confirmed as a false positive (e.g., the potential hazard was sensor error). Alternatively, the vehicle may treat every potential hazard as a hazard object that may interfere with the vehicle's path of travel. Either course can be undesirable. Waiting may result in an inability to avoid the hazard object or in a maneuver to avoid the hazard object that is unnatural or uncomfortable for any passengers of the vehicle. Treating a potential hazard as a hazard object may result in the vehicle making unnecessary maneuvers (such as slowing down or moving laterally) where the potential hazard does not resolve.

Instead, and according to the teachings herein, proactive risk mitigation may be used that considers the reactive capabilities of the vehicle in planning a proactive trajectory for the vehicle that minimizes speed and/or lateral changes in movement responsive to a potential hazard while still allowing for a comfortable and safe reactive response (i.e., a reactive trajectory) in the event a hazard object interferes with the path of the vehicle.

This solution can leverage the fact that even when a driving environment is dynamic, the response by a vehicle (i.e., driven by a human, remotely operated, etc.) to a road condition can be predicted/anticipated. The behavior of a hazard object may be similarly predicted because traversing a vehicle transportation network is governed by rules of the road (e.g., a vehicle turning left yields to oncoming traffic, a vehicle drives between lane markings), by social conventions (e.g., driver(s) yield to the driver on the right at a stop sign), and physical limitations (e.g., a stationary object does not instantaneously move laterally into a vehicle's path).

This predictability may be used to predict hazard object behavior to control the response of a vehicle, such as an autonomous vehicle, a semi-autonomous vehicle, or any other vehicle including an advanced driver assist system (ADAS), while that vehicle traverses a vehicle transportation network. For example, if the vehicle is traveling in its lane on a two-lane road and approaching an intersection, it is likely that other vehicles may be approaching the same intersection at the same time. As such, a vehicle may approach the intersection at a slower speed to be able to verify that the intersection is clear of hazards before proceeding. In this case, a proactive trajectory for the vehicle may be determined that adjusts the planned path and speed proactively for collision avoidance if the hazard object materializes as predicted.

Where the hazard object is a dynamic object, however, a predicted behavior based on expected constraints may not accurately capture the full range of possible behaviors. A dynamic object may fail to yield or swerve outside of its expected path. A dynamic object may speed up or slow down, either alone or in combination with another unlikely behavior (e.g., failing to yield or swerving). In such cases, the interaction of the vehicle with the dynamic object may occur at an uncertain time and location. The proactive trajectories described herein address this unpredictability.

Further, where multiple hazards are identified, whether those hazards include a dynamic object or not, each hazard may be considered separately. However, separately considering each hazard may not result in an optimal trajectory because different hazards may represent different levels of risk to the vehicle. Considering the hazards as a whole to define a proactive trajectory is desirable, particularly where the vehicle is traveling along narrow lanes or residential streets, where the multiple hazards on both sides of the vehicle can result in a cluttered driving environment.

In addition to actual (e.g., sensed or observed) hazard objects, as described above, the disclosure herein is also related to (e.g., applies to) virtual hazards. In addition to reacting to (e.g., adjusting their driving behavior in response to) observed objects, human drivers tend to also drive slower and take other precautionary measures when driving around tight corners and/or driving in limited visibility environments (e.g., on a foggy day or a lane is not completely visible) or in anticipation of vehicles unexpectedly appearing. A human driver would anticipate the possibility that another road user (e.g., a vehicle) may emerge from just beyond their perception limits and take proactive actions in case of such occurrences. For example, a human driver may slow down or move over depending on the visibility range. To mimic human driver behaviors, therewith providing comfort to the occupants of a vehicle, the proactive risk mitigation described herein can also apply to virtual hazards (or virtual vehicles).

A virtual vehicle is an instantiated vehicle that is added to a world model. At the time that the virtual vehicle is added to the world model, the virtual vehicle does not correspond to an actual vehicle sensed by sensors of the vehicle. Processing of the virtual vehicle can proceed, at least to a great extent, as if it were in fact a sensed vehicle. That is, proactive risk mitigation can plan trajectories based on (e.g., in consideration of) virtual vehicles. Proactive risk mitigation with generalized virtual vehicles creates (e.g., instantiates) virtual vehicles in occluded regions of a road (e.g., a lane thereon) or at a maximum perception range. The virtual vehicles can then be used within the frameworks described herein, such as in proactive risk mitigation and trajectory planning, as hazards such that constraints can be generated. As described herein the constraints can be or include decreased speeds and/or pre-allocating space for passing. It is noted that unless otherwise explicitly stated or the context makes clear, references to a "hazard" encompasses an actual hazard and a virtual hazard.

To describe some implementations of the proactive risk mitigation according to the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
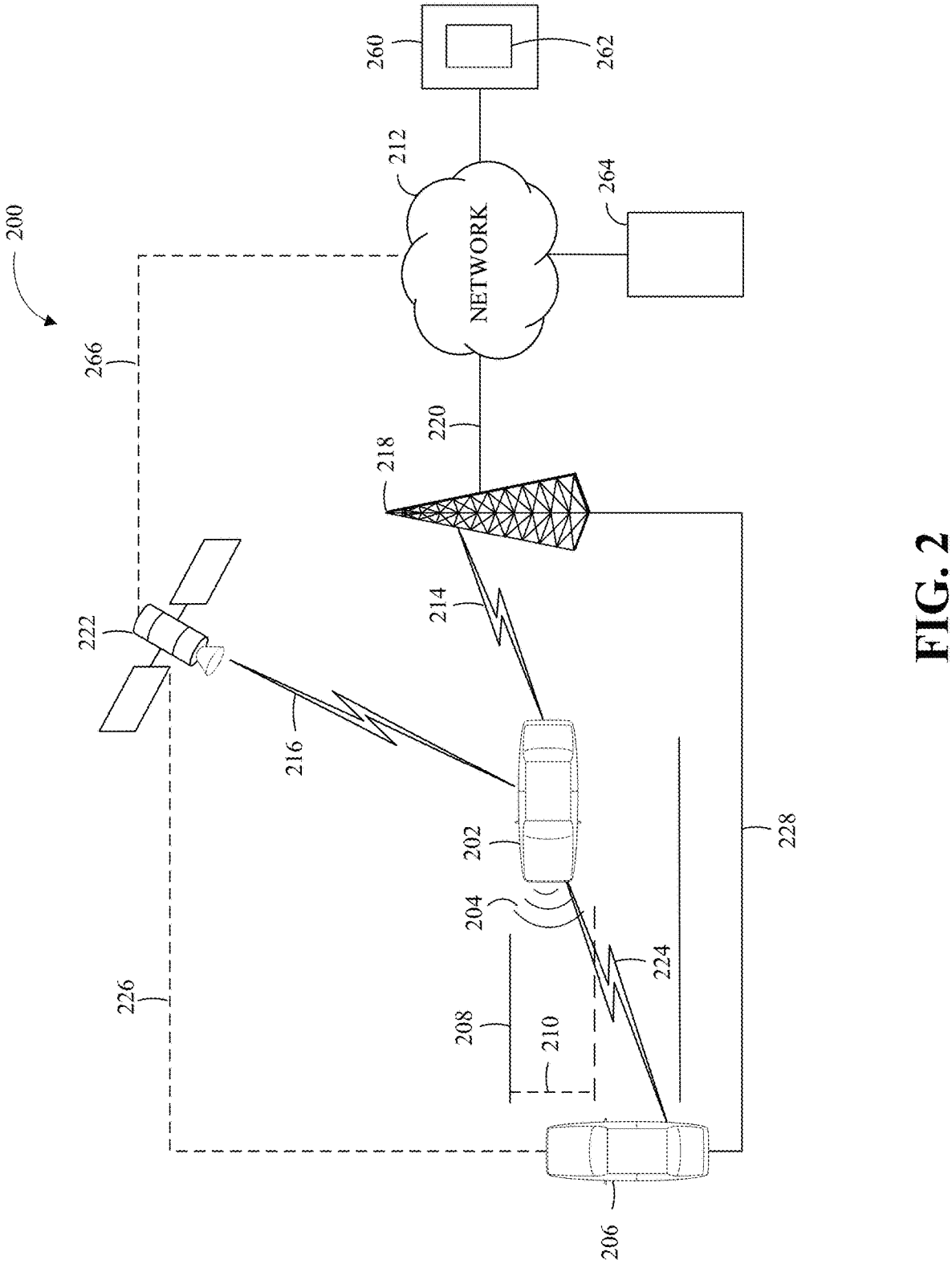
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
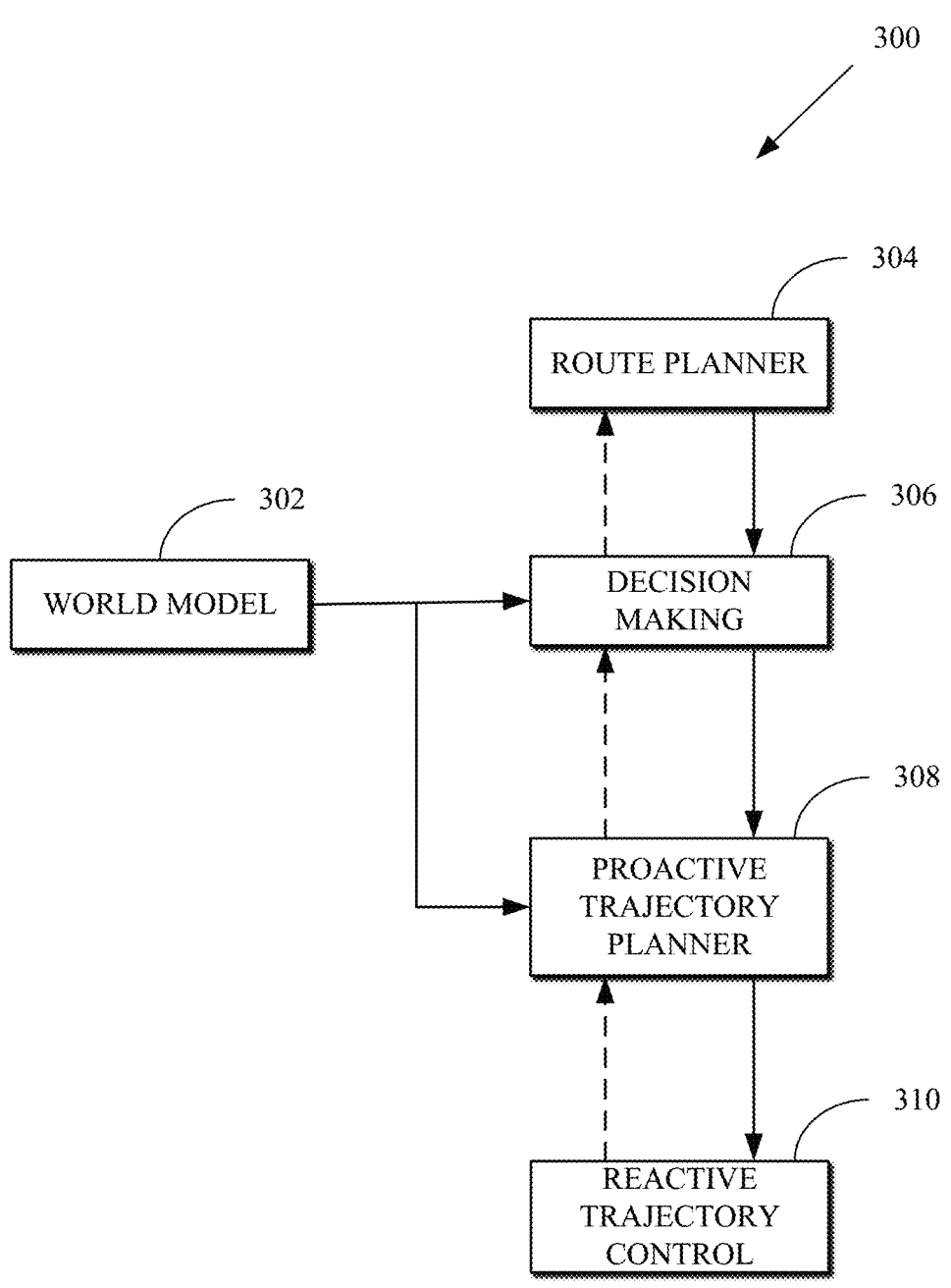
FIG. 3 is a diagram of a system for vehicle control using edging and virtual stop line generation according to implementations of this disclosure.

FIG. 3 is a diagram of a system 300 for vehicle control using edging and virtual stop line generation according to implementations of this disclosure. Although described with a vehicle traveling through a vehicle transportation network, such as the vehicle transportation network 208, the teachings herein may be used in any area navigable by a vehicle, which areas are collectively referred to as a vehicle transportation network. The system 300 may represent a software pipeline of a vehicle, such as the vehicle 100 of FIG. 1. The system 300 includes a world model 302, a route planner 304, a decision making module 306, a proactive trajectory planner 308, and a reactive trajectory control 310. Other examples of the system 300 can include more, fewer, or other components. In some examples, the components can be combined; in other examples, a component can be divided into more than one component. The system 300 is not required to be implemented in a vehicle, instead the system 300 may be implemented in whole or in part by a remote support control system, such as a remote support control system operated at the server computing device 234.

The world model 302 receives sensor data, such as from the sensor 126 of FIG. 1, and determines (e.g., converts to, detects, etc.) objects from the sensor data. That is, the world model 302 determines hazard objects (e.g., road users) from the received sensor data. For example, the world model 302 can convert a point cloud received from a light detection and ranging (LiDAR) sensor (i.e., a sensor of the sensor 126) into an object, such as a hazard object. Sensor data from several sensors can be fused together to identify the objects. Examples of objects include a non-motorized vehicle (e.g., a bicycle), a pedestrian or animal, a motorized vehicle, etc.

The world model 302 can receive sensor information that allows the world model 302 to calculate and maintain additional information for at least some of the detected objects. For example, the world model 302 can maintain a state for at least some of the determined objects. The state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model 302 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model 302 uses an instance of the trajectory planner to generate the predicted trajectories for each object hypothesis for at least some of the dynamic objects. For example, an instance of the trajectory planner can be used to generate predicted trajectories for vehicles, bicycles, and pedestrians. In another example, an instance of a trajectory planner, such as the trajectory planner described below, can be used to generate predicted trajectories for vehicles and bicycles, and a different method can be used to generate predicted trajectories for pedestrians.

The objects maintained by the world model 302 can include hazard objects, which can include static objects, dynamic objects, or both.

The route planner 304 determines a road-level plan. For example, given a starting location and a destination location, the route planner 304 determines a route from the starting location to the destination location. The route planner 304 can determine the list of roads (i.e., the road-level plan) to be followed by the vehicle to navigate from the starting location to the destination location.

The road-level plan determined by the route planner 304 and the objects (and corresponding state information) maintained by the world model 302 can be used by the decision making module 306 to determine discrete-level decisions along the road-level plan. Examples of decisions included in the discrete-level decisions may include: stop at the next intersection, move forward slowly, accelerate to a certain speed limit, merge into the next lane, etc.

The proactive trajectory planner 308 can receive the discrete-level decisions, the objects (and corresponding state information) maintained by the world model 302, and the predicted trajectories and likelihoods of the external objects from the world model 302. The proactive trajectory planner 308 can use at least some of the received information to determine a detailed-planned trajectory, also referred to herein as a proactive trajectory, for the vehicle.

For example, the proactive trajectory planner 308 determines a next-few-seconds trajectory. As such, and in an example where the next few seconds are the next 6 seconds (i.e., a look-ahead time of 6 seconds), the proactive trajectory planner 308 determines a trajectory and locations for the vehicle in the next 6 seconds. For example, the proactive trajectory planner 308 may determine (e.g., predict, calculate, etc.) the expected locations of the vehicle at several time intervals (e.g., every one-quarter of a second, or some other time intervals). The proactive trajectory planner 308 is described in more detail below.

The reactive trajectory control 310 can handle situations that the vehicle may encounter but may not be handled by the proactive trajectory planner 308. Such situations include situations where the proactive trajectory of the proactive trajectory planner 308 was based on misclassification of objects and/or unanticipated situations that rarely occur. For example, the reactive trajectory control 310 can modify the proactive trajectory in response to determining that a static object to the left of the vehicle is misclassified. The object may have been classified as a large truck; however, a new classification determines that it is a static road barrier wall. In another example, the reactive trajectory control 310 can modify the proactive trajectory in response to a sudden tire blowout of the vehicle. Other examples of unanticipated situations include another vehicle swerving suddenly (e.g., due to late decision to get to highway off-ramp or tire blowout) into the lane of the vehicle and a pedestrian or other object emerging suddenly from behind an occlusion.

In some implementations, a predictive algorithm of the proactive trajectory planner 308 may be configured to produce plans at 10 hz; on the other hand, the reactive trajectory control 310 may be configured to produce plans at 100 hz.

Figure 4:
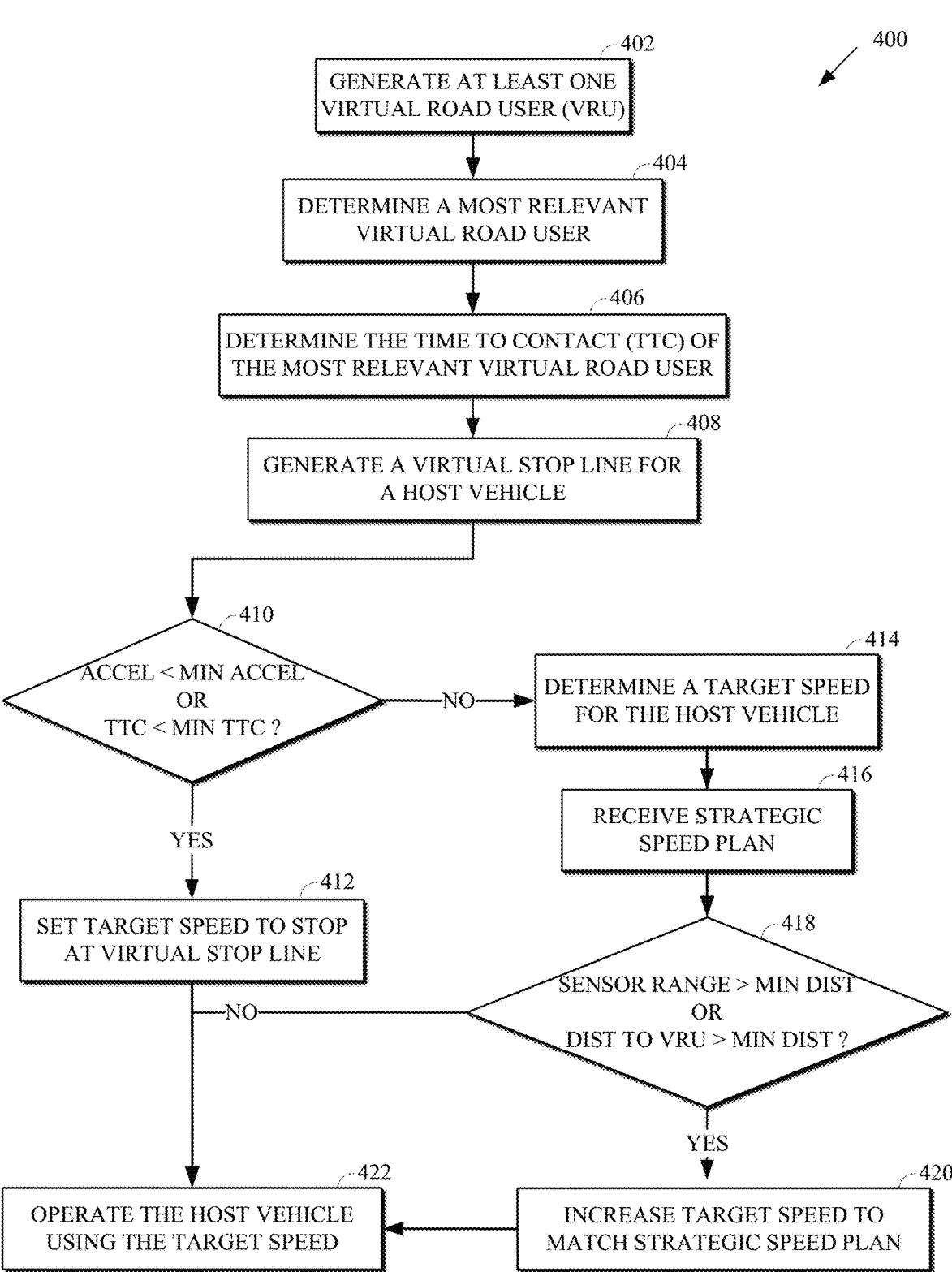
FIG. 4 is a flowchart diagram of a method for edging and virtual stop line generation according to implementations of this disclosure.

FIG. 4 is a flowchart diagram of a method or process 400 for edging and virtual stop line generation according to an implementation of the teachings herein. The process 400 includes operations 402 through 422, which are described below. The process 400 can be implemented in whole or in part by the system 300 of FIG. 3, in particular by the proactive trajectory planner 308. The process 400 can be stored in a memory (such as the memory 122 of FIG. 1) as instructions that can be executed by a processor (such as the processor 120 of FIG. 1) of a host vehicle (such as the vehicle 100 of FIG. 1). The process 400 may be implemented in whole or in part by a remote support control system, such as at the server computing device 234.

The process 400 receives inputs, where the inputs may include sensor data (i.e., sensor observations), such as the measurement from one or more sensors 126. The sensor data can be used to detect real-world objects. That is, for example, the sensor data can be used to determine that a real-world object exists within the view of the host vehicle.

In an example, data from one or more cameras can be used to determine the class of a detected object. Non-limiting examples of classes include "car." "sports car," "sedan," "large truck." "pedestrian," and "bicycle." In another example, a classification can be assigned based on the motion, over time, of light detection and ranging (LiDAR) data, e.g., a LiDAR point cloud. It is noted that different sensor data may provide different object classifications. For example, a first classification of "bicycle" may be determined based on the LiDAR data whereas a second classification of "jogger" may be determined based on camera data. Accordingly, the classification of an object may be determined probabilistically (e.g., which of the first or second classifications is more likely). As the classification is probabilistic, the classification of an object can change over time. Different sensor data may be fused together to determine the classification.

In an implementation, the process 400 may receive as inputs map information. The map information can include map lane structures (also referred to herein as road structures or mapped lanes). The map lane structure of a given lane can include successor lane information, predecessor lane information, and sibling lane information.

At operation 402, the process 400 generates at least one virtual road user. The virtual road user may be a virtual vehicle, or a virtual hazard as described above. The position of the at least one virtual vehicle is dependent on the range of sensors of a host vehicle. The host vehicle may be the vehicle 202 of FIG. 2. That is the at least one virtual vehicle may be positioned at the edge (i.e., border) of the range of the sensors of the host vehicle. For example, as the host vehicle approaches an intersection, due to various factors such as other road users or other real-world object (e.g., building, bus stop, bench, etc.), the range of the sensors of a host vehicle is limited. The range of the sensors may vary from narrow (e.g., the width of the host vehicle) to wide (e.g., as wide as the range of the sensors will allow). When the range of the sensors is narrow (i.e., less than a minimum distance threshold) a virtual road user is generated at the edge of the range of the sensors. When the range of the sensors is wide (i.e., greater than or equal to a minimum distance threshold) a virtual road user may not be placed (may be omitted) at the edge of the range of the sensors.

At operation 404, the process 400 determines a most relevant virtual road user, also called a most relevant road user. The most relevant virtual road user is a virtual road user of the at least one virtual user that may be associated with the earliest crossing lane to the host vehicle. In other words, the most relevant virtual road user may be the virtual road user associated with the lane in which the host vehicle will cross at the earliest time relative to the virtual road user associated with the lane. For example, as the host vehicle approaches the intersection, the intersection may have more than one lane. Depending on the planned trajectory (i.e., path or route) of the host vehicle, the rules of the road, and the range of the sensors in different directions, the host vehicle may cross different lanes earlier than others. The virtual road user associated with the earliest lane that the host vehicle may cross may be the most relevant virtual road user (e.g., from the perspective of the host vehicle), which is considered the virtual road user having the earliest interaction with the host vehicle.

At operation 406, the process 400 determines a time to contact of the most relevant virtual road user. The time to contact of the most relevant road user represents the amount of time the host vehicle may have until colliding with most relevant road user. The time to contact may be determined using the acceleration of the host vehicle, a predicted trajectory of the most relevant road user and a relative distance between the host vehicle and the most relevant road user. That is the time to contact may be determined by using the acceleration of the host vehicle as well as the predicted trajectory of the most relevant virtual road user and predicting the point in which the two will intersect. Then based on the acceleration of the host vehicle, the predicted trajectory of the most relevant road user and the distance between the host vehicle and the most relevant virtual road user, the process 400 determines the amount of time that may pass before the host vehicle reaches the point of intersection.

At operation 408, the process 400 generates a virtual stop line for the host vehicle. The virtual stop line represents the furthest point, in the current lane that the host vehicle is travelling in, that the host vehicle can travel before entering the intersection. In other words, the host vehicle may be required to stop before entering the intersection, and the virtual stop line represents the point at which the host vehicle may stop. The virtual stop line may be created at an offset (longitudinally) from the point of intersection with the most relevant road user. The distance of the offset may be dependent upon the speed limit of the road as well as whether the host vehicle is crossing the intersection or merging into one of the lanes. In an example, an ideal offset for the host vehicle crossing the intersection on a road with a speed limit of 25 miles per hour (mph) or less may be 6 meters (m). Continuing this example, if the speed limit of the road is greater than 25 mph, the offset may increase to 6.5 m. Alternatively, if the host vehicle is merging on to a lane of the intersecting road and the speed limit is 25 mph or less, an ideal offset may be 4.5 m. Lastly, if the speed limit increases to greater than 25 mph, than the ideal offset increases to 5.5 m for the merging host vehicle.

While ideal values for the offset are given for the various scenarios, these are not the only values that may be used. Other values or more ranges or classifications of values may be used as appropriate. In general, the offset may increase with the speed limit of the road and may be higher for crossing the intersection than for merging into a lane (e.g., for the same speed).

At operation 410, the process 400 determines if the vehicle needs to stop at the virtual stop line. The determination may be based on the acceleration of the host vehicle, the time to contact, or some combination thereof. A minimum acceleration and a minimum time to contact may be dependent on the speed limit of the road that the host vehicle is either crossing or merging onto. The minimum acceleration ensures the host vehicle is moving fast enough through the intersection while the minimum time to contact ensures there is enough time for the host vehicle to cross the intersection if there was an actual road user in place of the virtual road user. If the acceleration of the vehicle is less than a minimum acceleration or the time to contact is less than a minimum time to contact the process 400 may determine that the host vehicle should stop at the virtual stop line. For example, if the speed limit of the road is 25 mph, the minimum acceleration may be −1 meters per second squared (m/s$^2$) and the minimum time to contact may be 1 second(s). Whereas if the speed limit of the road is 45 mph, the minimum acceleration may be −0.5 m/s² and the minimum time to contact may be 3.5 s.

If the host vehicle either has an acceleration of less than the minimum acceleration or the time to contact is less than a minimum time to contact, the process 400 proceeds to operation 412. However, if the acceleration of the host vehicle is greater than or equal to the minimum acceleration and the time to contact is greater than or equal to the minimum time to contact, the process 400 proceeds to operation 414.

At operation 412, the process 400 sets the target speed so the host vehicle stops at the virtual stop line. That is, the host vehicle may not be able to proceed through the intersection safely due to the acceleration of the host vehicle being less than the minimum acceleration or the time to contact being less than the minimum time to contact. Accordingly, the process 400 may set the target speed for the vehicle to stop at the virtual stop line instead of attempting to either cross the intersecting road or merge into a lane of the intersecting road. For example, given an acceleration of 0.1 m/s², a time to contact of 3 s, and a speed limit of a 45 mph, the process 400 may determine, using the minimum acceleration and minimum time to contact from above, that the host vehicle cannot safely traverse the intersection and therefore may set the target speed to stop at the virtual stop line. Alternatively, if instead the speed limit is 25 mph, and all other factors remain the same, the process 400 may determine that the host vehicle can safely traverse the intersection. Thus, the process 400 will not set the target speed to stop at the virtual stop line. Instead, the process 400 will proceed to operation 414.

At operation 414, the process 400 determines a target speed for the host vehicle. The target speed may be determined based on the relative distance to the most relevant virtual road user and the time to contact. More specifically, the target speed may be based on the minimum of two equations using the relative distance to the most relevant virtual road user and the time to contact. The equation using relative distance may be represented by equation (1).

$$(relDist - 30) * (1.5/50)$$

In equation (1) the variable relDist is the relative distance between the host vehicle and (e.g., the trajectory of) the most relevant virtual road user.

The equation using the time to contact (TTC) may be represented by equation (2).

$$(TTC - 3) * (1.5/5)$$

For example, if the most relevant virtual road user is close to the host vehicle or the time to contact is short (e.g., the most relevant virtual road user is moving quickly), the host vehicle may go slower to safely gain visibility before proceeding through the intersection.

At operation 416, the process 400 receives a strategic speed plan. The strategic speed plan may be received from the route planner 304 of FIG. 3. The strategic speed plan may be specific speeds along different portions of the planned trajectory of the host vehicle. The strategic speed plan represents the ideal speed at which the host vehicle may travel as it traverses the vehicle transportation network 208. Although described as a separate operation, the strategic speed plan is periodically transmitted and can be received before the process 400 starts and updated during the process 400.

At operation 418, the process 400 evaluates the range of the sensors (also called a sensor range) and the distance to the virtual road user(s). If the sensor range exceeds a minimum distance or the distance to the closest virtual road user of the virtual road user(s) exceeds the minimum distance than the process 400 proceeds to operation 420, otherwise the process 400 proceeds to operation 422. In other words, if the range (e.g., view) of the sensors of the host vehicle is no longer limited due to other real-world objects, or the virtual road users generated at the edge of the range of the sensors of the host vehicle are far enough away that the vehicle may safely traverse the intersection, the process proceeds to operation 420.

At operation 420, the process 400 increases the target to match the strategic speed plan. That is, the target speed may be set to match the strategic speed plan for the corresponding location of the host vehicle along the planned trajectory.

At operation 422, the process 400 operates the host vehicle using the target speed plan. In other words, the target speed plan may be sent to a control system of the host vehicle. The control system may be the controller 114 or the vehicle 100 of FIG. 1. The control system may then set the speed of the host vehicle to match the target speed as the host vehicle traverses the intersection. In implementations where a remote vehicle support system is used, the process 400 may directly operate the host vehicle.

Figure 5A:
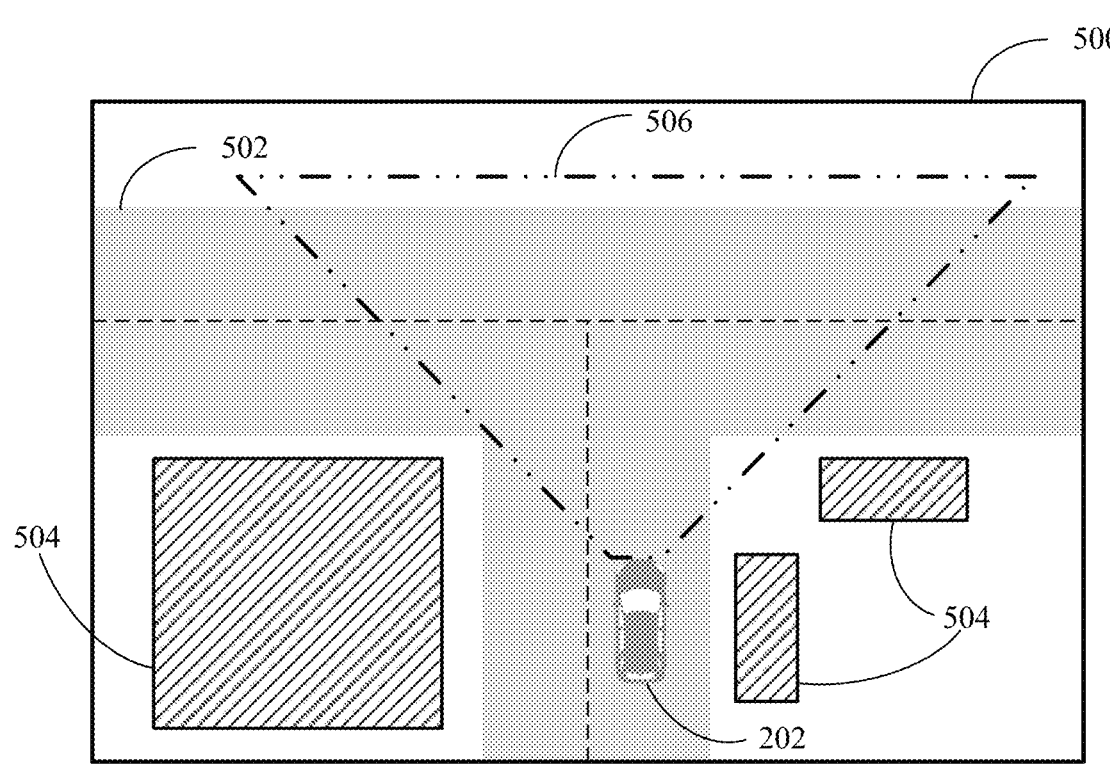
FIGS. 5A and 5B are diagrams of an example of determining the visible space of the host vehicle in accordance with implementations of this disclosure.
Figure 5B:
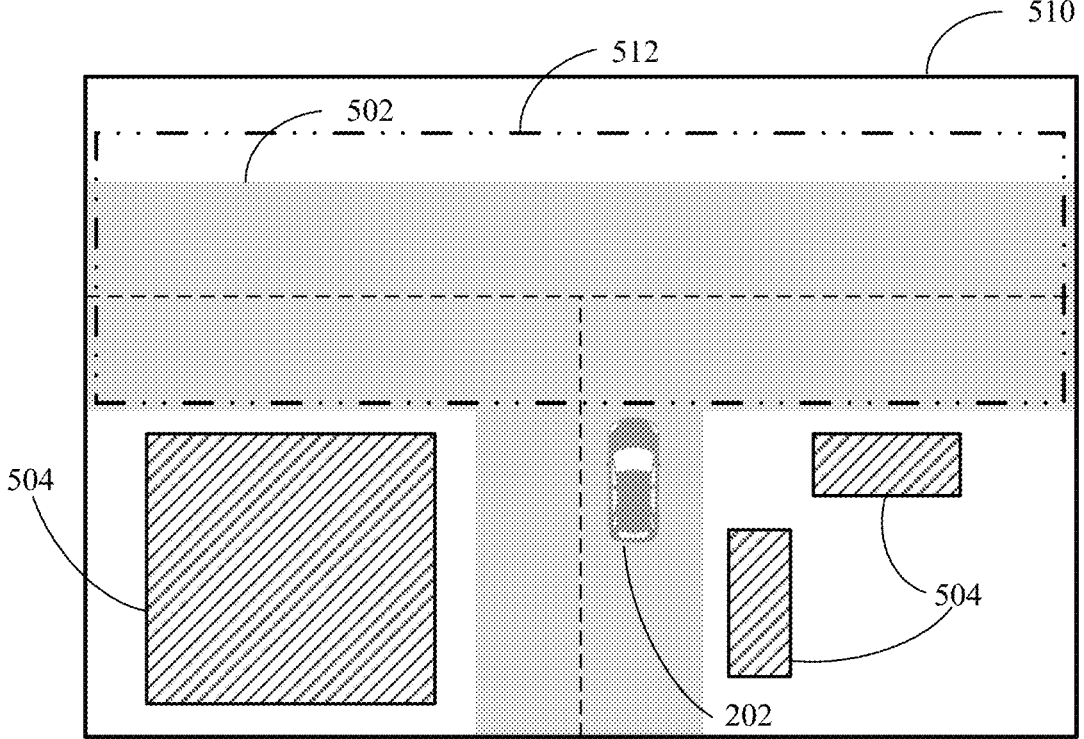

FIGS. 5A and 5B are diagrams of an example of determining the visible space of the host vehicle that may be used in generating at least one virtual road user at operation 404. The diagram 500 of FIG. 5A is an example of the visible space (i.e., the range of the sensors) of the host vehicle. The diagram 500 depicts the vehicle 202 (i.e., the host vehicle), an intersection 502, real-world objects 504 (e.g., buildings, parked vehicles, other road users, trees, etc.), and the visible space 506 of the host vehicle. As depicted, the visible space 506 of the vehicle 202 may be limited due to the position of the vehicle 202 in relation to the intersection 502 and the real-world objects obstructing the sensor range(s) of the vehicle 202. As such, the visible space 506 is limited to a trapezoidal shape with the narrow edge oriented toward the front of the vehicle 202 and the wider edge oriented towards the opposite side of the intersection 502 from the vehicle 202. In other words, the further away from the intersection 502 the vehicle 202 is, the smaller or more limited the visible space 506 may be.

The diagram 510 of FIG. 5B is another example of the visible space of the host vehicle. The diagram 510 depicts the vehicle 202, the intersection 502, the real-world objects 504, and the visible space 512. In this situation, the visible space 512 of the vehicle 202 may not be limited by the position of the vehicle 202 in relation to the intersection 502 due to the real-world objects 504. As such the visible space 512 may be limited by the range of the sensors of the vehicle 202. Therefore, the visible space 512 is shown as a rectangle that extends to the full range of the sensors of the vehicle 202.

Figure 6A:
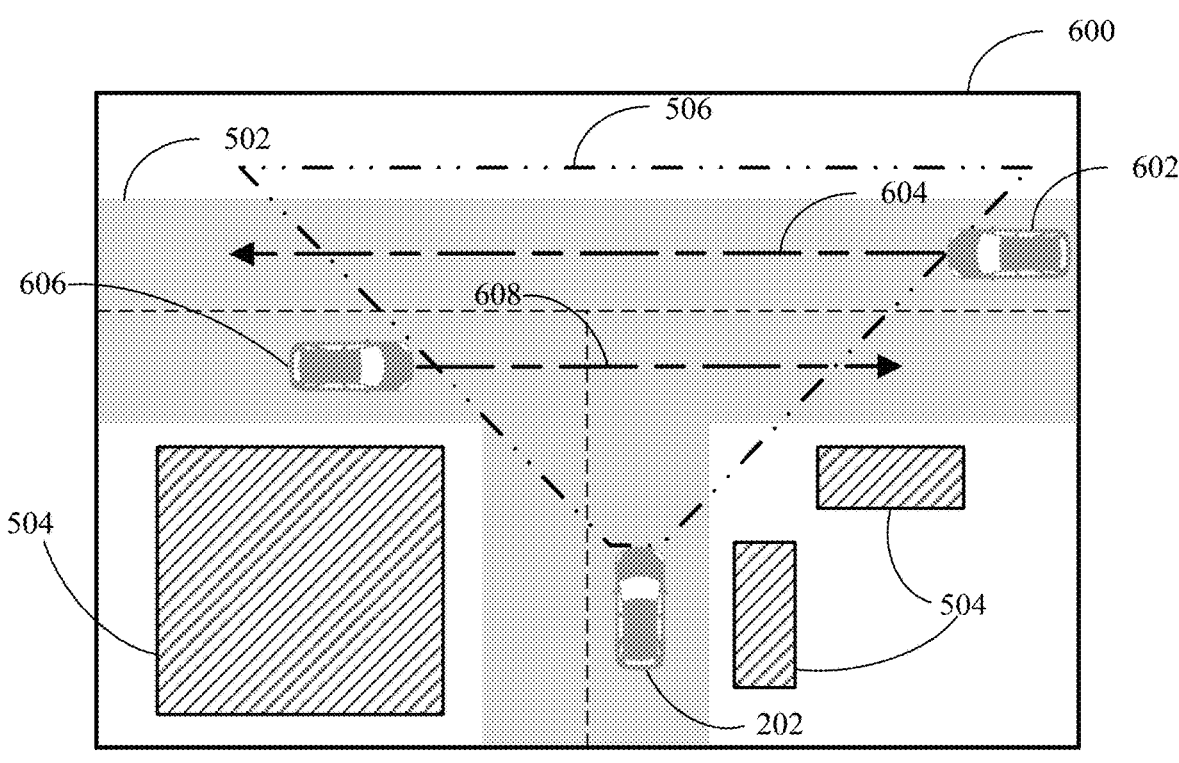
FIG. 6A is a diagram of examples of identifying virtual road user locations.

FIG. 6A is a diagram 600 of an example of identifying virtual road user locations, also referred to as generating at least one virtual road user at operation 404. The example depicts the vehicle 202, the intersection 502, the real-world objects 504, the visible space 506, a virtual road user 602 with a predicted trajectory 604, and a virtual road user 606 with a predicted trajectory 608. As the vehicle 202 approaches the intersection 502, the visible space 506 of the vehicle 202 is limited. For this reason, the visible space 506 may be seen as a trapezoid as described above. Because the sensor range of the vehicle may not extend beyond the minimum distance referenced at operation 418 of process 400, the process 400 may generate virtual road users. The virtual road users may be generated at the edge of the boundaries of the visible space 506 of the vehicle 202. For example, the virtual road user 602 is generated within the associated lane along the outer right edge of the visible space 506. When the virtual road user 602 is generated, the process 400 may also generate the predicted trajectory 604. Additionally, along the left edge of the visible space 506, the process 400 may generate another virtual road user 606 as well as the predicted trajectory 608.

Figure 6B:
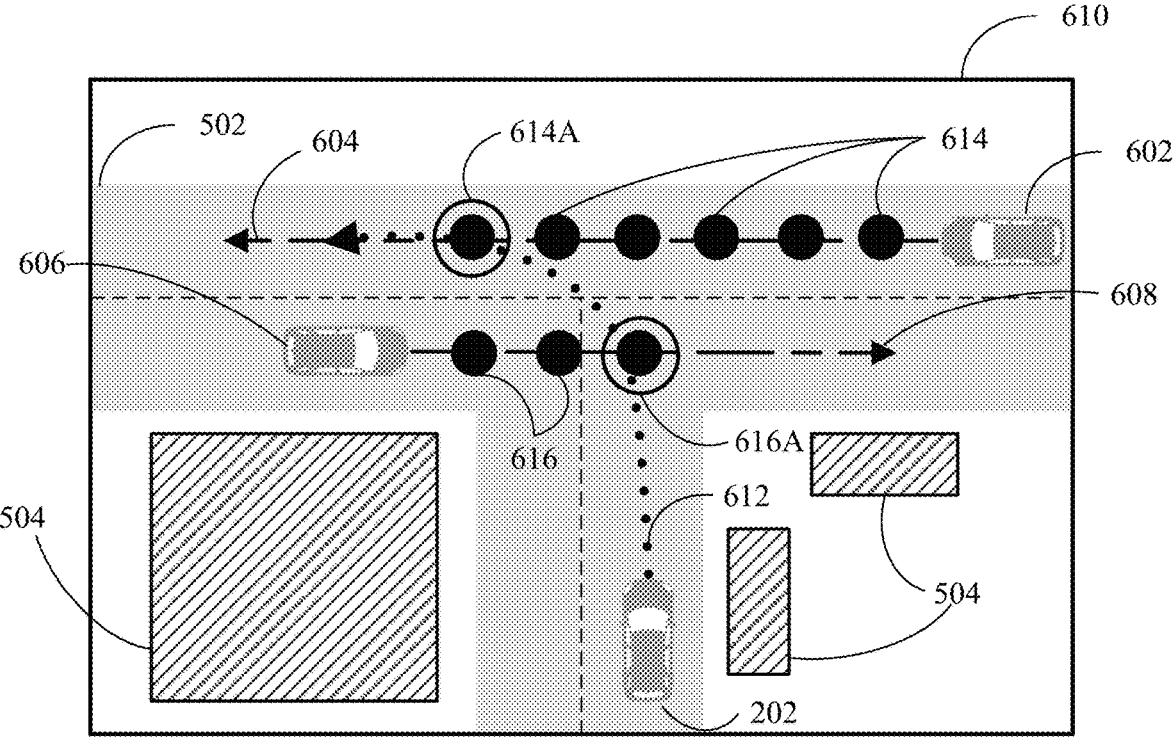
FIG. 6B is a diagram of example of determining the most relevant virtual road user in accordance with implementations of this disclosure.

FIG. 6B is a diagram 610 of an example of determining the most relevant virtual road user at operation 404. The diagram 610 depicts the vehicle 202, the intersection 502, the real-world objects 504, the virtual road user 602 with the predicted trajectory 604, the virtual road user 606 with the predicted trajectory 608, a planned trajectory 612 for the vehicle 202, intervals 614 for the predicted trajectory 604 and intervals 616 for the predicted trajectory 608. The most relevant virtual road user is determined by finding the earliest crossed lane. As the vehicle 202 approaches the intersection 502 along the planned trajectory 612, the vehicle may cross the path (e.g., the predicted trajectory 608) of the virtual road user 606 at interval 616A. An interval may be measured using any time unit that is appropriate. In this example, the interval is measured in seconds. When the vehicle 202 crosses the predicted trajectory 608, the interval 616A may be 3 s from the virtual road user 606 in an example. As the vehicle 202 continues along the planned trajectory 612, the vehicle 202 may cross the path (e.g., the predicted trajectory 604) of the virtual road user 602 at interval 614A. The interval 614A represents a point in time 6 s from the virtual road user 602. As such, the earliest crossed lane of the intersection 502 would be the lane associated with virtual road user 606. Therefore, the virtual road user 606 is considered the most relevant road user at operation 404, and the time to contact is 3 s.

Furthermore, the determination of the most relevant virtual road user may use the distance to the interaction between the host vehicle and the predicted trajectory in addition to the interval. For example, given two predicted trajectories for two corresponding virtual road users the two predicted trajectories may both have an equal interval (e.g., the planned trajectory of the host vehicle may cross the predicted trajectory of either virtual road user at the same time). If the interval between the host vehicle and the virtual road users is equal, then the distance to the interaction between the host vehicle and the predicted trajectory may be used to determine the most relevant virtual road user.

Figure 7A:
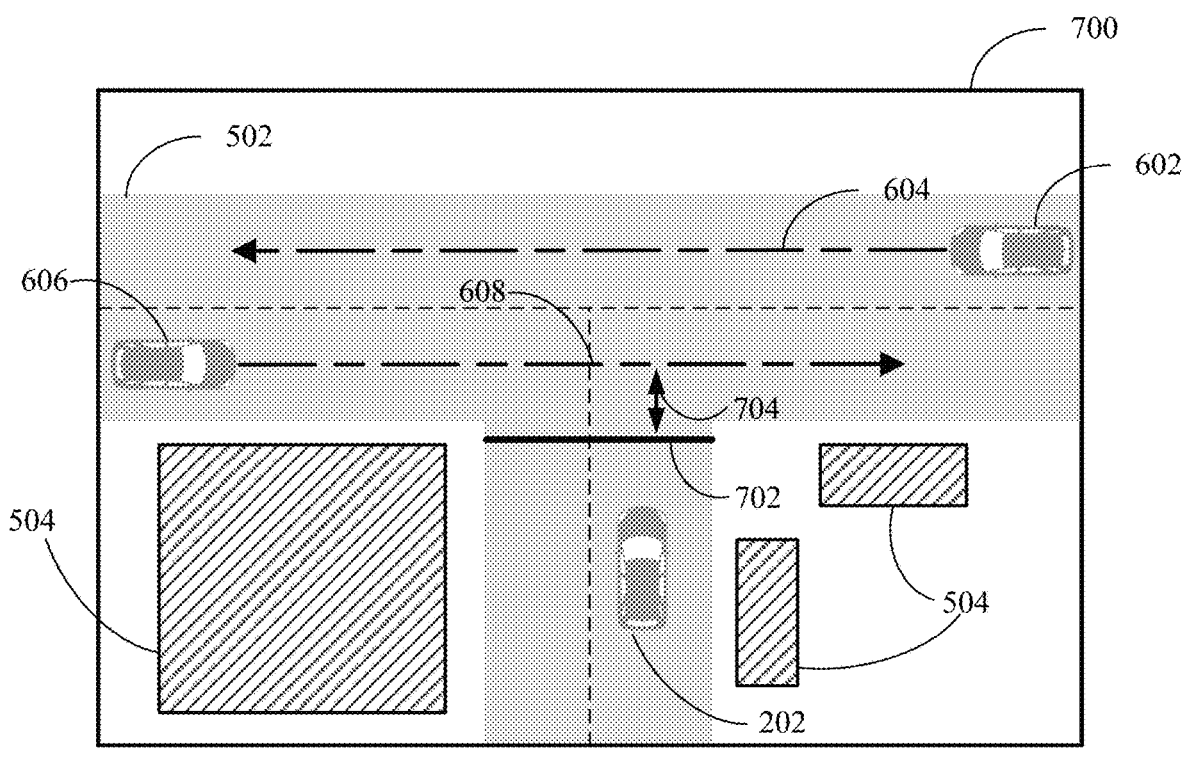
FIGS. 7A and 7B are diagrams of examples of generating a virtual stop line in accordance with implementations of this disclosure.
Figure 7B:
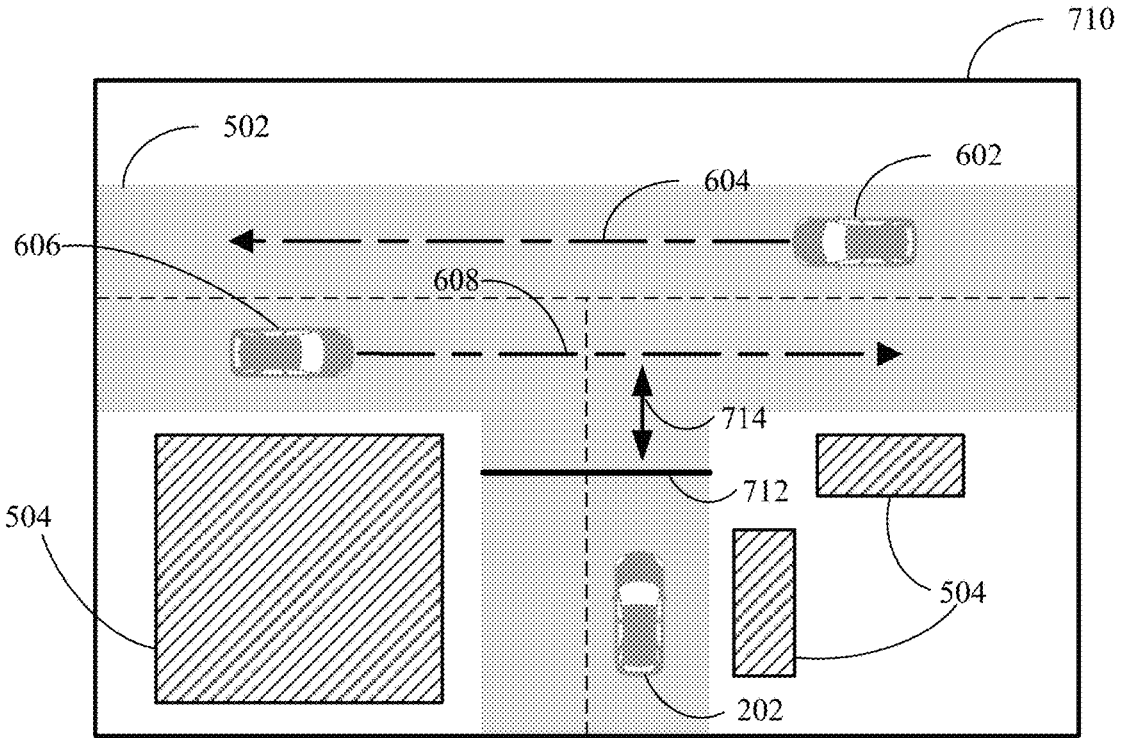

FIGS. 7A and 7B are diagrams of examples of generating a virtual stop line at operation 408 of the process 400. The virtual stop line may represent the closest point to an intersection that the host vehicle can stop without entering the intersection (e.g., based on the speed limit and the lack of visibility of the host vehicle). The diagram 700 of FIG. 7A is an example of generating a virtual stop line when the host vehicle has a planned trajectory for crossing an intersection with a speed limit of 25 mph or less. The diagram 700 depicts the vehicle 202, the intersection 502, the real-world objects 504, the virtual road user 602 with the predicted trajectory 604, the virtual road user 606 with the predicted trajectory 608, a virtual stop line 702, and an offset 704. As the vehicle 202 approaches the intersection 502, the process 400 will determine where to generate the virtual stop line 702 in accordance with operation 408. For example, given the vehicle 202 with a planned trajectory to cross the intersection 502 with defined a speed or less (for example, a speed of up to and including 25 mph), the virtual stop line 702 may be created with an offset 704 from the predicted trajectory of the most relevant virtual road user (in this example, the predicted trajectory 608 of the virtual road user 606) of a first defined offset, for example 6 m.

The diagram 710 of FIG. 7B is an example of generating a virtual stop line when the host vehicle has a planned trajectory for crossing an intersection with a speed greater than the defined speed, in this example 25 mph. The diagram 710 depicts the vehicle 202, the intersection 502, the real-world objects 504, the virtual road user 602 with the predicted trajectory 604, the virtual road user 606 with the predicted trajectory 608, a virtual stop line 712, and an offset 714. In this example, the vehicle 202 with a planned trajectory to cross the intersection 502 with a speed greater than the defined speed, the virtual stop line 712 may be created with a second defined offset as the offset 714. The second defined offset is greater than the first defined offset. In this example, the second defined offset is 6.5 m.

While diagram 700 and diagram 710 depict two scenarios, the first scenario (i.e., diagram 700) of the vehicle 202 crossing the intersection 502 and the second scenario (i.e., diagram 710) of the vehicle 202 performing a left hand turn into the intersection 502, there may be more or fewer scenarios. For example, the vehicle 202 may have a planned trajectory to complete a right hand turn at the intersection 502. While the principles applied in the new scenario are the same as those of the previous scenarios, the offsets may vary. As such, the new scenario may have a new set of offsets defined specific to the new scenario.

Figure 8:
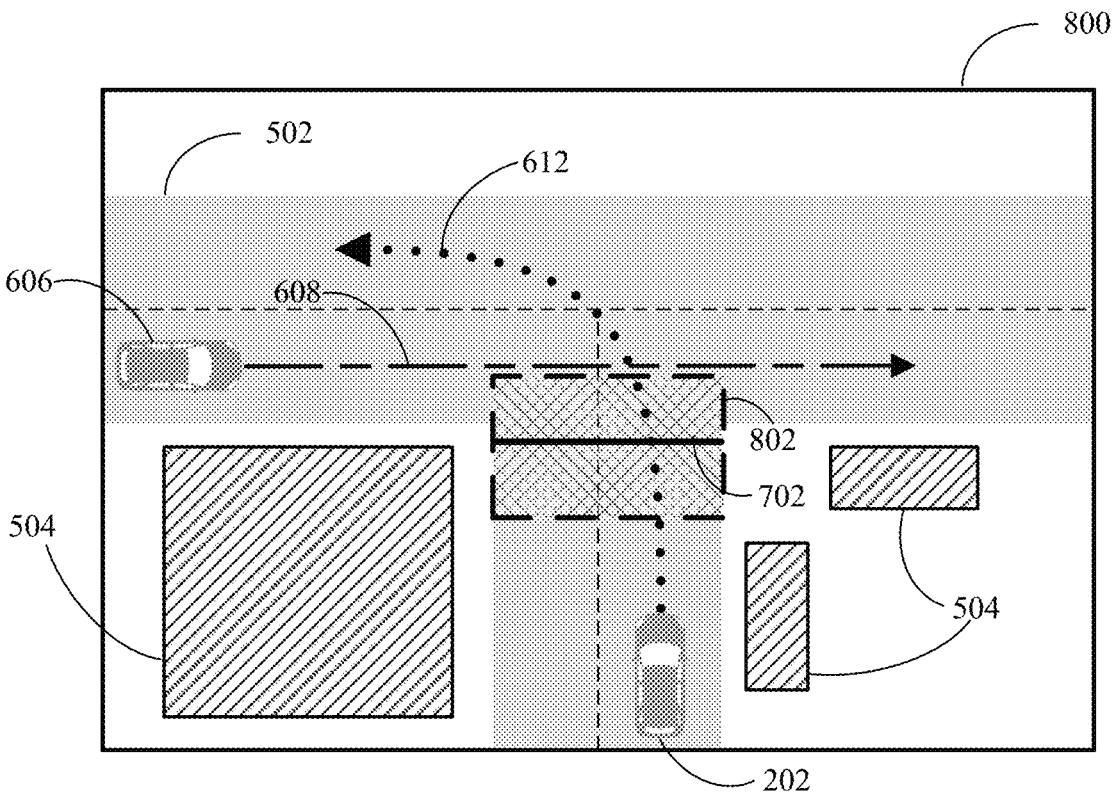
FIG. 8 is a diagram of an example of determining a target speed limit in accordance with an implementation of this disclosure.

FIG. 8 is a diagram 800 of an example of determining a target speed limit according to operation 414 of the process 400. The diagram 800 depicts the vehicle 202, the intersection 502, the real-world objects 504, the virtual road user 606 (the most relevant virtual road user in this example), the predicted trajectory 608 of the virtual road user 606, the planned trajectory 612 of the vehicle 202 (also called the host vehicle), and a target speed limit 802. As the vehicle 202 approaches the intersection 502, the most relevant virtual road user (i.e., virtual road user 606) has already been determined at operation 404 of the process 400. The process 400 has determined at operation 410 that stopping at the virtual stop line 702 (as described in FIG. 7A) may not be required. The process 400 determine a target speed limit 802 according to the operation 414 described above. More particularly, the target speed limit may be determined using the minimum of equation (1) and equation (2). Given a time to contact of 4 s and a relative distance to the most relevant virtual vehicle of 40 m, the formula may be represented by equation (3).

$$\min\left((relDist - 30) * (1.5/50),\ (TTC - 3) * (1.5/5)\right)$$

In this example, the variable relDist may be 40 m, and the variable TTC may be 4 s.

Figure 9:
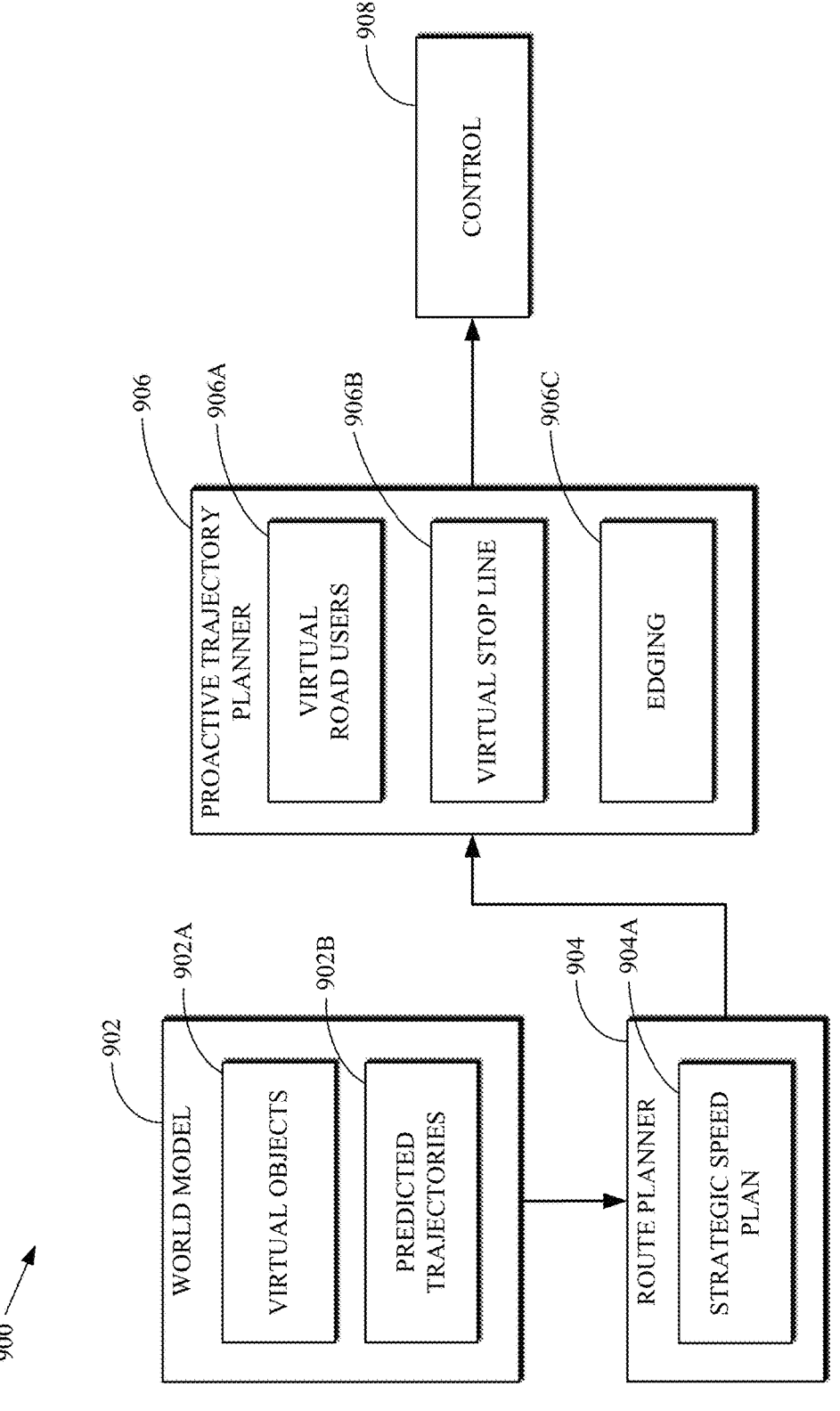
FIG. 9 is a diagram of another system for vehicle control using edging and virtual stop line generation according to implementations of this disclosure.

FIG. 9 is a diagram of another apparatus or system 900 for vehicle control using edging and virtual stop line generation according to implementations of this disclosure. The system 900 may represent a software pipeline of a vehicle, such as the vehicle 100 of FIG. 1. The system 900 includes a world model 902, a route planner 904, a proactive trajectory planner 906, and a control system 908. Other examples of the system 900 can include more, fewer, or other components. In some examples, the components can be combined; in other examples, a component can be divided into more than one component. The system 900 is not required to be implemented in a vehicle, instead the system 900 may be implemented in whole or in part by a remote support control system, such as a remote support control system operated at the server computing device 234. The system 900 is like the system 300, so repetitive description is omitted unless desirable for context.

The world model 902 is like the world model 302 of FIG. 3. Thus, the world model 902 receives sensor data and tracks and maintains objects (e.g., real-world objects, hazard objects, etc.) and any projected trajectories of moving objects. The world model 902 may be used by operation 402 of FIG. 4 to produce virtual objects 902A and predicted trajectories 902B associated with each of the virtual objects 902A that are moving objects. In the examples above, the virtual objects 902A can include the virtual road user 602 and the virtual road user 606, and the predicted trajectories 902B can include the predicted trajectory 604 of the virtual road user 602 and the predicted trajectory 608 of the virtual road user 606.

The output of the world model 902, for example the virtual objects 902A and the predicted trajectories 902B, provides input to the route planner 904. The route planner 904 in FIG. 9 may incorporate the functions of the route planner 304 and the decision making module 306 of FIG. 3. Accordingly, the route planner 904 may produce a strategic speed plan 904A based at least in part on the virtual objects 902A and the predicted trajectories 902B. The strategic speed plan 904A may include a series of discrete speed targets for different portions of the vehicle transportation network 208 along the path of the host vehicle. The strategic speed plan 904A, the virtual objects 902A, and the predicted trajectories 902B may be passed to the proactive trajectory planner 906.

The proactive trajectory planner 906 may function like the proactive trajectory planner 308 of FIG. 3. That is, the proactive trajectory planner 906 can determine a detailed-planned trajectory for the host vehicle that is based on the operations 404 through 420 of FIG. 4. The proactive trajectory planner 906 receives as input the strategic speed plan 904A, the virtual objects 902A, and the predicted trajectories 902B. The proactive trajectory planner 906 uses the one or more virtual road users 906A and their corresponding trajectories to determine the most relevant virtual road user at operation 404, determine the TTC at operation 406, and generate a virtual stop line 906B at operation 408. The proactive trajectory planner 906 may then use this information to, if needed, modify the strategic speed plan 904A in an edging module 906C by determining or otherwise setting a target speed at operation 414 or operations 414 and/or 420.

The target speed may be output to a control system 908 for use to control the host vehicle. The control system 908 may be the controller 114 of FIG. 1. The control system 908 may be a ADAS, such as an automated braking system. The control system 908 may receive the target speed limit from the proactive trajectory planner 906. The control module may use the target speed limit to operate the host vehicle (i.e., the vehicle 202). For example, the proactive trajectory planner 906 may determine based on the most relevant virtual road user (for example, the virtual road user 606), the TTC, and the relative distance to the virtual stop line 702 that that host vehicle must stop at the virtual stop line 702. As such, the target speed would be set to stop the host vehicle at operation 412. Alternatively, the proactive trajectory planner 912 may use this information to determine that the host vehicle should proceed (e.g., edge) past the virtual stop line 702 at a reduced speed determined at operation 414 to ensure that the path is clear before accelerating to match the strategic speed plan 904A when possible (e.g., at operation 420). The control system 908 can operate the host vehicle using the target speeds at operation 422, including deceleration and/or braking. Instead of implementing the control system 908 at the controller 114, the control system 908 can be remotely control the host vehicle.

Herein, the terminology "passenger", "driver", or "operator" may be used interchangeably. Also, the terminology "brake" or "decelerate" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by (i.e., cause) a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example." "embodiment," "implementation," "aspect," "feature." or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
generating at least one virtual road user, wherein a position of a respective virtual road user of the at least one virtual road user corresponds to a border of an unobstructed range of a sensor of a host vehicle approaching an intersection of a vehicle transportation network;
determining a most relevant virtual road user of the at least one virtual road user, the most relevant virtual road user associated with an earliest crossing lane of the intersection from a perspective of the host vehicle;
determining a time to contact for the most relevant virtual road user, wherein the time to contact is based on an acceleration of the host vehicle, a predicted trajectory of the most relevant virtual road user, and a relative distance between the host vehicle and the most relevant virtual road user;
determining, based on the time to contact and the relative distance, a target speed for the host vehicle; and
operating the host vehicle using the target speed as input to a control system of the host vehicle.

2. The method of claim 1, comprising:
generating a virtual stop line for the host vehicle, the virtual stop line representing a closest point to the intersection that the host vehicle can stop before entering the intersection; and
stopping the host vehicle at the virtual stop line in response to determining that at least one of the acceleration of the host vehicle is less than a minimum acceleration or the time to contact is less than a minimum time to contact.

3. The method of claim 2, wherein the closest point is determined based on a speed limit of a road on which the host vehicle is travelling and whether the host vehicle is merging into a lane of the road or crossing the road.

4. The method of claim 1, wherein the target speed is based on a minimum of a first equation using the relative distance and a second equation using the time to contact.

5. The method of claim 1, wherein the range of the sensor of the host vehicle increases as the host vehicle approaches the intersection.

6. The method of claim 5, comprising:
receiving a strategic speed plan; and
increasing the target speed to match the strategic speed plan as the range of the sensor of the host vehicle exceeds a minimum distance.

7. The method of claim 6, comprising:

increasing the target speed to match the strategic speed plan as a distance to the at least one virtual road user exceeds the minimum distance.

8. The method of claim 1, wherein determining the most relevant virtual road user comprises:
generating a planned trajectory of the host vehicle;
determining a first speed limit associated with a respective virtual road user of the at least one virtual road user;
calculating a distance between the host vehicle and the respective virtual road user of the at least one virtual road user;
determining, based on the planned trajectory, the first speed limit, and the distance, the most relevant virtual road user as a virtual road user of the at least one virtual road user having an earliest interaction with the host vehicle.

9. An apparatus, comprising:
a processor configured to:
generate at least one virtual road user, wherein a position of a respective virtual road user of the at least one virtual road user corresponds to a border of an unobstructed range of a sensor of a host vehicle approaching an intersection of a vehicle transportation network;
determine a most relevant virtual road user of the at least one virtual road user, the most relevant virtual road user associated with an earliest crossing lane of the intersection from a perspective of the host vehicle;
determine a time to contact for the most relevant virtual road user, wherein the time to contact is based on an acceleration of the host vehicle, a predicted trajectory of the most relevant virtual road user, and a relative distance between the host vehicle and the most relevant virtual road user;
determine, based on the time to contact and the relative distance, a target speed for the host vehicle; and
operate the host vehicle using the target speed as input to a control system of the host vehicle.

10. The apparatus of claim 9, wherein the processor is configured to:
generate a virtual stop line for the host vehicle, the virtual stop line representing a closest point to the intersection that the host vehicle can stop before entering the intersection; and
stop the host vehicle at the virtual stop line in response to determining that at least one of the acceleration of the host vehicle is less than a minimum acceleration or the time to contact is less than a minimum time to contact.

11. The apparatus of claim 9, wherein the target speed is based on a minimum of a first equation using the relative distance and a second equation using the time to contact.

12. The apparatus of claim 9, wherein the processor is configured to:
receive a strategic speed plan; and
increase the target speed to match the strategic speed plan as the range of the sensor of the host vehicle exceeds a minimum distance.

13. The apparatus of claim 9, wherein the processor is configured to:
receive a strategic speed plan; and
increase the target speed to match the strategic speed plan as a distance to the at least one virtual road user exceeds a minimum distance.

14. The apparatus of claim 9, wherein to determine the most relevant virtual road user comprises to:
generate a planned trajectory of the host vehicle;

determine a first speed limit associated with a respective virtual road user of the at least one virtual road user;

calculate a distance between the host vehicle and the respective virtual road user of the at least one virtual road user;

determining, based on the planned trajectory, the first speed limit, and the distance, the most relevant virtual road user as a virtual road user of the at least one virtual road user having an earliest interaction with the host vehicle.

15. A non-transitory computer-readable medium storing instructions operable to cause one or more processors to perform operations comprising:

generating at least one virtual road user, wherein a position of a respective virtual road user of the at least one virtual road user corresponds to a border of an unobstructed range of a sensor of a host vehicle approaching an intersection of a vehicle transportation network;

determining a most relevant virtual road user of the at least one virtual road user, the most relevant virtual road user associated with an earliest crossing lane of the intersection from a perspective of the host vehicle;

determining a time to contact for the most relevant virtual road user, wherein the time to contact is based on an acceleration of the host vehicle, a predicted trajectory of the most relevant virtual road user, and a relative distance between the host vehicle and the most relevant virtual road user;

determining, based on the time to contact and the relative distance, a target speed for the host vehicle; and operating the host vehicle using the target speed as input to a control system of the host vehicle.

16. The non-transitory computer-readable medium of claim 15, wherein the operations comprise:

generating a virtual stop line for the host vehicle, the virtual stop line representing a closest point to the intersection that the host vehicle can stop before entering the intersection; and stopping the host vehicle at the virtual stop line in response to determining that at least one of the acceleration of the host vehicle is less than a minimum acceleration or the time to contact is less than a minimum time to contact.

17. The non-transitory computer-readable medium of claim 16, wherein the closest point is determined based on a speed limit of a road on which the host vehicle is travelling and whether the host vehicle is merging into a lane of the road or crossing the road.

18. The non-transitory computer-readable medium of claim 15, wherein the operations comprise:

receiving a strategic speed plan; and increasing the target speed to match the strategic speed plan as the range of the sensor of the host vehicle exceeds a minimum distance.

19. The non-transitory computer-readable medium of claim 15, wherein the operations comprise:

receiving a strategic speed plan; and increasing the target speed to match the strategic speed plan as a distance to the at least one virtual road user exceeds a minimum distance.

20. The non-transitory computer-readable medium of claim 15, wherein determining the most relevant virtual road user comprises:

generating a planned trajectory of the host vehicle;

determining a first speed limit associated with a respective virtual road user of the at least one virtual road user;

calculating a distance between the host vehicle and the respective virtual road user of the at least one virtual road user;

determining, based on the planned trajectory, the first speed limit, and the distance, the most relevant virtual road user as the virtual road user of the at least one virtual road user having an earliest interaction with the host vehicle.

\* \* \* \* \*